D. LATCHAW.
Bee-Hives.

No. 141,443.

Patented August 5, 1873.

2 Sheets--Sheet 1.

Witnesses.
G. Mathys
John C. Kenron

Inventor.
David Latchaw
per ____
Attorneys.

D. LATCHAW.
Bee-Hives.
No. 141,443. Patented August 5, 1873.
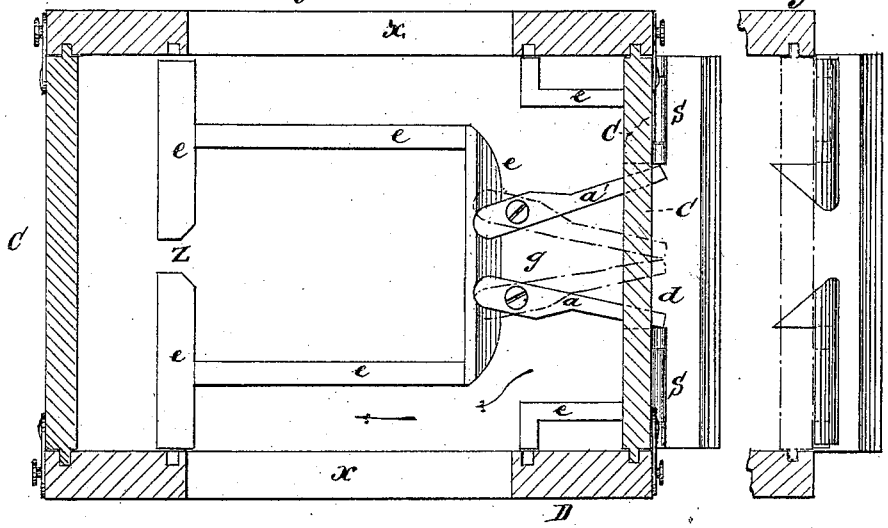
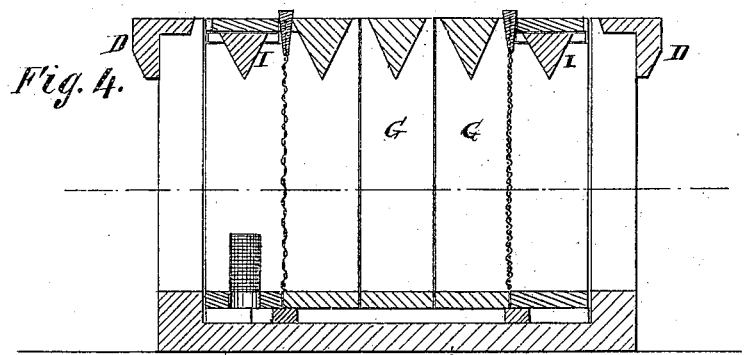
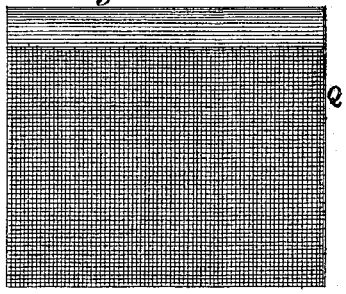
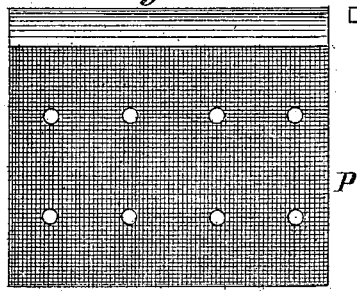
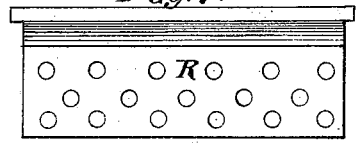
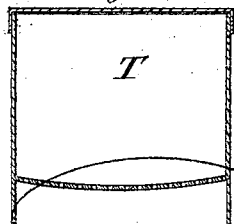
Witnesses:
G. Mathys
Colon C. Kenson
Inventor:
David Latchaw
per ——— Attorneys.

UNITED STATES PATENT OFFICE.

DAVID LATCHAW, OF BARKEYVILLE, PENNSYLVANIA.

IMPROVEMENT IN BEE-HIVES.

Specification forming part of Letters Patent No. 141,443, dated August 5, 1873; application filed November 6, 1872.

*To all whom it may concern:*

Be it known that I, DAVID LATCHAW, of Barkeyville, in the county of Venango and State of Pennsylvania, have invented a new and Improved Bee-Hive, of which the following is a specification:

My improvements relate, first, to a mode of preventing robber bees gaining access to the brood or honey chamber, and also entrapping them by means of adjustable pivoted guides arranged in the bee-entrance and a cage or prison placed at one side of the comb-frames, both the guides and cage serving for other useful purposes, in the ordinary economy of the hive, when not thus utilized; second, to providing the comb-frames with removable guides, thus enabling the filled comb of one frame to be removed and transferred to an empty frame, or to a box for transportation to market or elsewhere, without removing the frame itself; third, to devices for closing the bee-entrance, which are adapted to co-operate with the guide-strips aforementioned.

Figure 1:
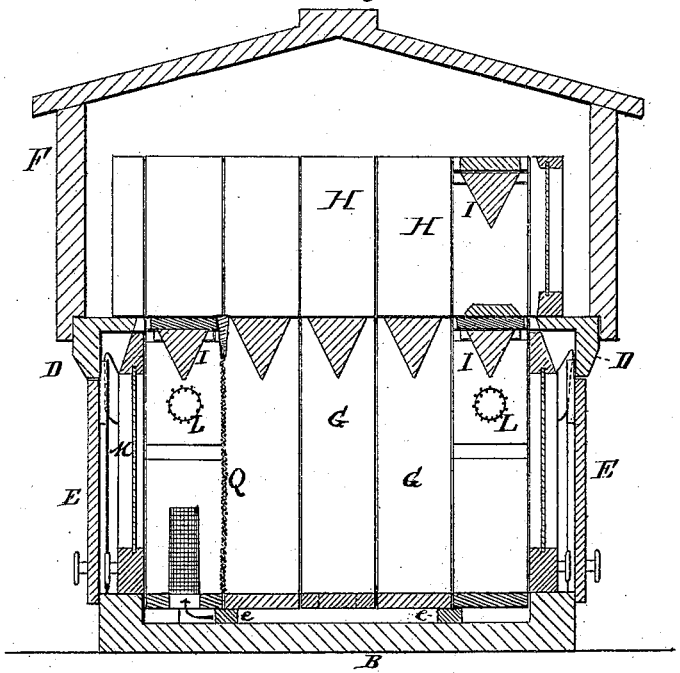
Figure 2:
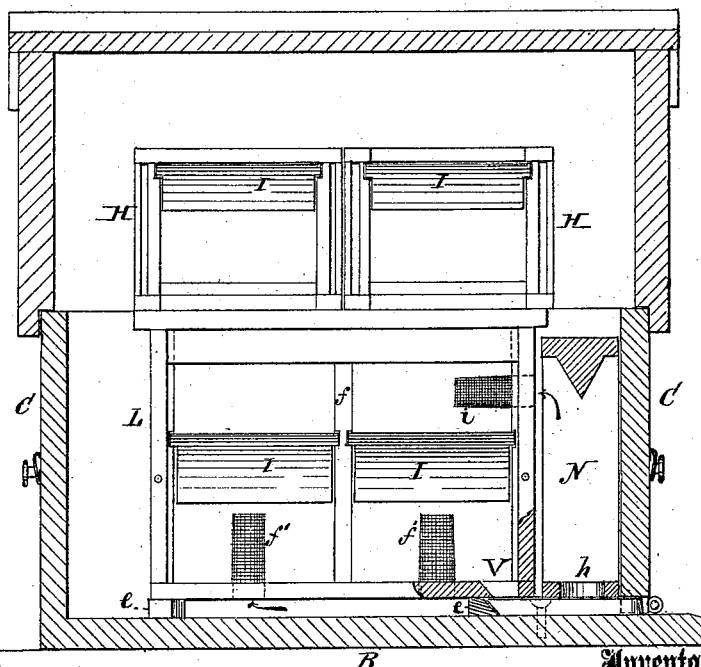

In the accompanying drawing, Sheets I and II, Figure 1, Sheet I, is a view of the case, the brood chamber or body of the hive, and one of the surplus honey-frames in cross-section. Fig. 2, Sheet 1, is a longitudinal section of the hive. Fig. 3, Sheet 2, is a plan view of the bottom board. Fig. 4 is a cross-section of the brood-comb frames, showing the wire-gauze plates arranged between them. Figs. 5 and 6 are side views of the wire-gauze plates. Fig. 7 is a side view of the perforated cloth partition or comb-building guide. Fig. 8 represents the blocks for closing the bee-entrance. Fig. 9 represents the feeding-box in cross-section.

The case inclosing the brood-chamber is composed of a bottom board, B, extended at the front to form an alighting-board, and two end and side pieces, C D, attached to each other by hooks or equivalent devices, so that any of them may be readily removed for the purpose of facilitating access to the interior of the hive, or for any desired manipulation of the contained comb-frames, &c. An opening, X, is formed in each side piece D, and closed by a removable door or cover, E. These openings are larger than the sash M to permit its insertion, removal, &c., so as to allow of removal or insertion of the latter without disturbing the cover of the hive. The top F is set on the case in the usual way. The comb-frames are connected to each other by dowel-pins, and with the side pieces D by tongue and groove. Thus they cannot be lifted out of the hive or displaced by any accident, nor can any one frame be moved in any manner so long as the case remains intact, or until the side pieces are unhooked from the end pieces. The top bars of said frames are cut out on their adjacent sides or edges to form passages through which the bees may ascend to the surplus honey-frames H. The slots run the whole length of the top bars so as to allow the condition of the comb to be readily inspected through them. The frames H are tongued and grooved together, and provided with openings at the bottom.

I provide each brood and surplus honey-frame with transverse grooves in its side bars just under the top bar in order to receive the rabbeted ends of beveled comb-guides I. In this way the comb-guide is made removable, transferable, &c., thus rendering it unnecessary when a frame is filled with honey to remove it entire, as is usually done; instead, the comb may be cut away from the frame on the sides and bottom, the guide pushed out, and the whole comb and its contents transferred to another place in the brood-chamber when the needs of the colony demand it, or to a box or other suitable receptacle for transportation to market. By dividing the brood-comb frames into two parts by a central vertical bar, $f$, as in Fig. 2, Sheet I, the guides are adapted to interchange with those of the surplus honey-frames, and hence, when the said frames have been filled with comb and honey, (for, as is well known, the bees will usually, if not invariably, fill the brood-chamber to its uttermost limits before resorting to the upper or surplus honey-chamber,) the guides may be removed with the attached comb and transferred to the surplus honey-frames H in order to induce the bees to work in them, also, to the profit of their owner. Aside from these advantages in manipulation of the frames the consumer of honey is not compelled to purchase along with the honey and at a high rate per pound a comb frame or section which is useless to him, while the bee-keeper is enabled to retain his frame and utilize it, as before, thus saving cost and delay of making a new frame. The benefits to the consumer or purchaser and the producer are therefore reciprocal.

To form my robber-trap, I pivot two thin narrow strips, $a\ a'$, of wood or metal, to the bottom board, so that their free ends project into the bee-entrance, (see Fig. 3, Sheet 2,) and I arrange a comb-frame, L, temporarily provided with wire-gauze cylinders $f'$ projecting inward from the apertures in the bottom and side bars at one side of the brood-comb frames or next the window or sash M. This frame, like all the others, is supported on thin strips $e\ e$ nailed to the bottom board, Fig. 3, Sheet 2.

To form a covered passage-way from the bee-entrance to the frame or prison-box L, another frame, N, may be arranged in the space between the ends of the comb-frames and the front C of the case, Fig. 2, Sheet 1.

The guide-strips being adjusted as shown by dotted lines, Fig. 3, Sheet 2, and the right-hand entrance closed by the block S on that side, the robbers will enter at $d$, and, following the direction of the arrow, Fig. 3, Sheet 2, pass beneath comb-frame N, and upward by means of the wire cylinders $f'$ into the box formed by the comb-frame L, the sash M, and wire-gauze partition Q, Fig. 5, Sheet 2. The adjacent cover E being removed, the light passing in through the window M will prevent the robbers seeking to return by the way they came in. When the inclosure is filled with robbers the sash may be removed, and the imprisoned bees allowed to escape at evening and return home. If robbers have already gained access to the hive—i. e., the brood-chamber—on attempting to retreat with their plunder they will pass into the triangular space $g$ between the guides; and since the guides, when closed together, prevent egress at the front, they (the bees) will pass up through the hole $h$ in the bottom bar of the frame N, and thence into the box L by means of the wire cylinder $i$ in the front end bar of the frame.

In order to secure the largest quantity of honey a large share of the drones of a colony should be destroyed during the honey harvest, in place of leaving the workers to do it late in the fall. The drones, being larger than the workers, cannot pass through openings of similar size; and hence, by adjusting the guide-strips $a\ a'$ so that a narrow entrance is left between their ends, most of the workers, upon entering the hive, will pass into the brood-chamber and the drones into the prison-box. The plate provided with the apertures should, in that case, form the inner side of the prison-box, as it will allow any workers which by chance enter the same to pass into the brood-chamber.

It is frequently desirable to restrict the queen to a certain number of comb-frames in the body of the hive, and for that purpose I employ a wire-gauze plate, P, Fig. 6, Sheet 2, which has a series of apertures of a size sufficient to admit the passage of the workers, but not the queen. Thus surplus honey may be secured in any desired number of the comb-frames, and brood or store honey in the remainder.

It will be understood that the wire-gauze partition-plates offer no obstruction to circulation of air, and hence the same odor will prevail in all parts of the hive.

As a means of causing the bees to build comb with regularity, and to confine them to one frame till they have nearly or quite filled it, the guide R, Fig. 7, Sheet 2, may be advantageously applied between the comb-frames. It is formed of muslin or other similar fabric, dipped in melted bees-wax. It has apertures like the wire-gauze plate P, to permit the bees to pass through from one frame to the other, and support themselves during the commencement of the comb-building. When the comb has been commenced the plate R may be removed.

This form of guide may also be employed as a substitute for the plate P, its dimensions being in that case the same as P's.

The blocks S, Fig. 2 and Fig. 8, Sheet 2, regulate the size of the bee-entrance. They have wings or projecting portions near their inner ends, which fit in the slot between the bottom board and the lower edge of the front of the hive, and which serve to retain them in place, and also to retain the guide-strips in the position to which they may be at any time adjusted, and assist in closing the side entrances.

A hole, V, Fig. 2, Sheet 1, is formed in the front end of one or more of the bottom bars of the frames, through which the bees ascend from the entrance. As shown in Fig. 1, Sheet 1, and Figs. 3 and 4, Sheet 2, the frames rest on strips $e$ secured to the bottom board. An opening, 2, is left between the two rear strips, to permit escape of any bees that may accidentally get into the space beneath the comb-frames when some or all of them have been removed or readjusted. The wire-gauze plates and the guide-strips or conductors $a$ are made to co-operate in the production of surplus honey by preventing a portion of the bees from entering the central or brood chamber.

A can or vessel with a raised perforated bottom may be used to feed the bees, when necessary, the same being set over the slots or openings between the top bars of the frames, through which the bees find their way upward.

I do not, however, claim this device as novel.

Having thus described my invention, what I claim as new, and desire to secure by Letters Patent, is—

1. In a bee-hive, a comb-frame provided with a supplemental removable comb-guide, substantially as hereinbefore described.

2. In a bee-hive, the combination of the guide-strips $a\ a'$ pivoted in the bee-entrance, a prison-box arranged at one side of the comb-frames and provided with apertures in its under side, and a passage-way leading thereto, all as shown and described.

3. The prison-box provided with wire cylinders, forming continuations of its entrance-apertures, as and for the purposes specified.

4. The combination, with the guide-strips and prison-box, of the front frame provided with the aperture in the bottom, whereby robbers seeking escape from the brood-chamber may be led into the prison-box, as set forth.

5. The entrance-blocks S provided with wings, as specified, in combination with the guide-strips, as and for the purpose specified.

DAVID LATCHAW.

Witnesses:
   THOS. D. D. OURAND,
   SOLON C. KEMON.